June 2, 1970        J. W. BARND        3,515,345

MULTI-ZONE TEMPERATURE CONTROL

Original Filed March 10, 1964        4 Sheets—Sheet 4

INVENTOR.
JOHN W. BARND
BY
MORGAN, FINNEGAN, DURHAM & PINE
ATTORNEYS

United States Patent Office 3,515,345
Patented June 2, 1970

3,515,345
MULTI-ZONE TEMPERATURE CONTROL
John W. Barnd, 32 Hollybrook Road,
Paramus, N.J. 07652
Original application Mar. 10, 1964, Ser. No. 350,791, now
Patent No. 3,351,128, dated Nov. 7, 1967. Divided
and this application Apr. 24, 1967, Ser. No. 647,578
Int. Cl. G05 23/30
U.S. Cl. 236—1                                21 Claims

ABSTRACT OF THE DISCLOSURE

A multi-zone temperature control system wherein individual heat exchangers are selectively decoupled from a central temperature distribution system which functions both in a heating mode and a cooling mode and utilizes a single thermostat within both modes. By utilizing a pair of heating resistors in association with the thermostat, one of the resistors functioning during the heating mode while both of the resistors are utilized during the cooling mode, one temperature level is capable of being maintained in one mode while a separate and distinct temperature level is capable of being maintained in the other mode.

---

This is a division of application Ser. No. 350,791, filed Mar. 10, 1964, now Pat. No. 3,351,128.

This invention relates to temperature control arrangements and methods and more particularly to multi-zone temperature control systems and methods for controlling temperature and other factors in each of a plurality of rooms, zones or compartments.

The invention is applicable to multi-zone temperature control in general. It is described, however, in terms of controlling the ambient air temperature.

The varying thermal conditions and requirements in the rooms of a building make individual temperature control in each or many of the rooms a desirable objective. However, the practical realization of such an arrangement frequently involves costly systems or modifications beyond the means of the user. Where economies are practised to reduce these costs, system performance suffers.

It is accordingly an object of the invention to provide an efficient and yet economical arrangement and method for multi-zone temperature control.

Additional objects of the invention are to provide multi-zone temperature control methods and arrangements in which individual zones are adjustably regulated according to their needs and in which such performance is accomplished without the need for separate circulating systems in each zone.

A further object of the invention is to provide methods and means for effecting individual temperature control in a plurality of zones supplied with a single-pipe circulating system.

A still further object of the invention is to provide improved temperature control techniques which may be attained by simple modifications to known systems.

A still further object of the invention is to achieve multi-zone temperature control with a minimum of labor, materials and control apparatus, with simple localized circuit connections, and without the need for elaborate electrical, plumbing or duct networks between each of the controlled zones and the central heat or coolant plant and control center.

Further objects and advantages of the invention include the attainment of personal comfort and fuel savings by means of efficient temperature control with a simple temperature control arrangement and process.

The foregoing and other objects and advantages of the invention will be set forth in part hereinafter and in part will be obvious herefrom or may be learned by practise with the invention, the same being realized and attained by means of the instrumentalities pointed out in the appended claims.

The invention consists in the novel methods, steps, parts, constructions, arrangements, combinations and improvements herein shown and described.

Serving to illustrate exemplary embodiments of the invention are the drawings of which:

Figure 1:
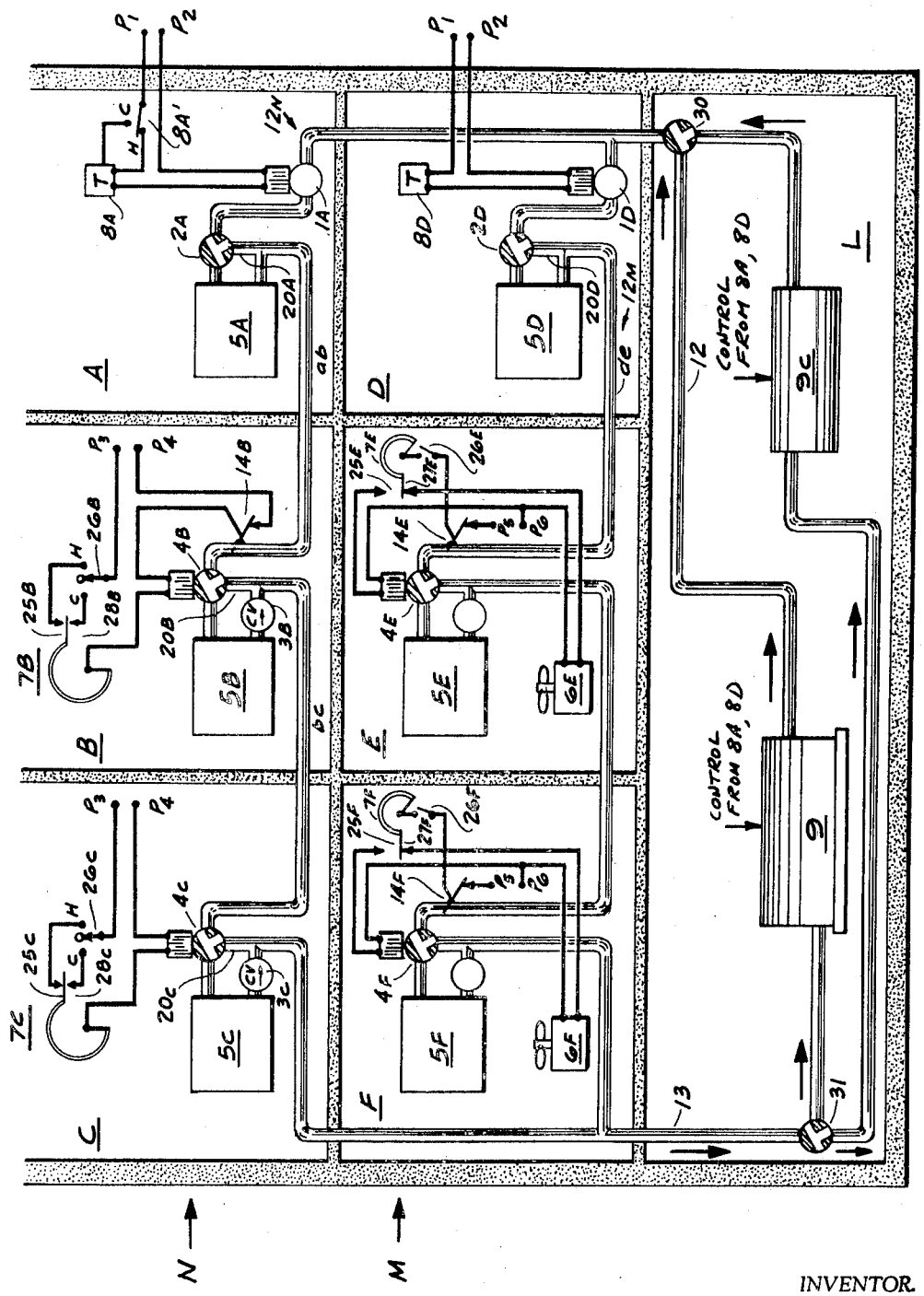
FIG. 1 is a diagrammatic and schematic view of an exemplary temperature-control arrangement according to the invention.

The embodiment of FIG. 1 is illustratively applied to the control of temperature in a multi-zone structure comprising a building having a basement L and upper levels N and M. The upper levels N and M are divided into zones, A, B, C and D, E, F, respectively. Zones A and D comprise master control zones while B, C, E and F comprise by-pass control zones. Although two groups of master zone/by-pass zone combinations A, B, C and D, E, F are illustrated, it is to be understood that in practise either one such combination or three or more may be utilized with a number of by-pass zones selected as required.

Each zone, A, B . . . F, which need not be an enclosed area as shown but may be a particular thermal area, is provided with respective heat transfer means embodied as a heat exchanger 5A, 5B . . . 5F which is illustratively a convector radiator. In addition, zones E and F illustratively include respective fan units 6E, 6F, adapted to cooperate with the adjacent heat exchangers 5E, 5F.

The illustrated system includes a heating system 9 in basement L with appropriate pumps, controls, etc. (not shown) and a single-pipe type water circulatory system connected thereto and including fed header 12, parallel branch pipe systems 12M and 12N connected thereto and disposed in levels M and N respectively and return header 13 to which the outlets of piping lines 12M, 12N are connected. Line 13 connects in turn to the inlet of heating unit 9.

With reference to level N, the branch pipe system 12N therein is illustratively connected to temperature responsive valve means in zone A embodied as a solenoid operated 2-way valve 1A. The outlet end of valve 1A is connected to by-pass control means illustratively comprising a 3-way manual valve 2A and a shunt pipe arrangement 20A, these being connected to heat exchanger 5A such that a portion of the circulating medium in branch 12N can be controlled to flow in an adjustable amount through heat exchanger 5A while the balance by-passes same. By this arrangement the temperature control capacity e.g. heating capacity of exchanger 5A in master control zone A is adjusted. Exchanger 5A may in practice comprise a plurality of spaced interconnected heat exchanger units.

From the interconnected outlet sides of exchanger 5A and shunt 20A serial connection is made to zone B via section *ab* of the pipe 12N. The inlet connection to zone B includes flow responsive control means embodied as a flow responsive electrical switch 14B. From 14B, fluid flow is directed to temperature responsive by-pass control means including a 3-way valve 4B which is illustratively solenoid actuated and is connected to exchanger 5B and the associated shunt line 20B. As with 5A, exchanger 5B may in practise comprise a plurality of individual exchange units. The outlet side of 5B may include a check valve 3B to prevent heat exchange during the by-pass mode. The solenoid operated by-pass valve is preferably of a type in which a valve failure leaves the associated heat exchanger open, i.e., not by-passed.

From zone B, serial connection is made via section bc of 12N to zone C which illustratively is equipped with a by-pass exchanger system 3C, 4C, 5C, 20C similar to zone B, but which does not include flow responsive switch means such as 14B. The outlet side of the control system in zone C is connected to return header 13.

Branch piping 12M in level M serially interconnects the temperature control system of zones D, E and F between inlet header 12 and return header 13. The piping and valve arrangement of master control zone D is similar to corresponding zone A. Similarly, zones E and F have installations similar to the corresponding arrangements of B and C, respectively. However, zones E and F also illustratively include respective fans or impellers 6E, 6F which operate in conjunction with the related heat exchangers 5E, 5F. In addition, zone F includes a flow responsive switch 14F while corresponding zone C does not. The outlet side of the control arrangement in zone F in connected to the return header 13.

The valve 1A in master control zone A is controlled by the thermostat 8A, these elements being serially connected to power terminals $P_1$, $P_2$. The solenoid of valve 1D in master control zone D is controlled by a thermostat, 8D, which connects the solenoid to the power terminals $P_1$ and $P_2$ when the thermostatic switch is closed.

The thermostat 8A illustratively includes a mode selector switch 8A' for effecting both heating and cooling operations.

Control over the 3-way valve 4B in zone B is effected with a circuit embodied as the serial combination of flow responsive switch 14B, the valve solenoid, and thermostatic control 7B. The thermostat 7B includes in series, a manual mode switch 26B and thermostatic contacts 25B. The circuit of zone B is energized from the power terminals $P_3$, $P_4$ thereof which may be connected via a local outlet in zone B to $P_1$ and $P_2$ or, to any other locally available power source. Where reduced potentials are appropriate, the terminals $P_3$, $P_4$ may be connected to the power terminals by way of a transformer. In practise zone B and one or more of the other by-pass zones may include a plurality of exchange units 5B with respective solenoid valves 4B, jointly controlled by the thermostat 7B.

Zone C is similar to zone B except for the omission of a flow responsive switch. Preferably, the electrical control components in each zone have ratings enabling them to be operated from the power source in the zone either directly or via a transformer. In this way the inherent feature of the invention of achieving control by local means is put to best advantage.

The valve 4E of zone E has its solenoid controlled from a circuit energized from power terminals $P_5$ and $P_6$. This circuit, starting at $P_5$, includes the serial combination of flow responsive switch 14E, manual cut-off 26E, thermostate 7E, thermostatic contacts 25E, the solenoid of valve 4E, and the return to power terminal $P_6$. The valve 4F in zone F is controlled by a similar circuit.

The fan unit 6E in zone E is controlled from power terminals $P_5$ and $P_6$ by way of a circuit which, starting at $P_5$, includes the flow responsive switch 14E, manual cut-out 26E, thermostat 7E, thermostatic contacts 27E, the motor of fan 6E and the return to $P_6$. The fan unit in zone F is controlled by a similar circuit.

The foregoing and other arrangements according to the invention, may be initially designed as such or may be effected by modification of conventional temperature control systems.

In the illustrated embodiment certain control factors obtain for heating functions. At the time when either zone A or zone D requires heat, the associated 2-way valve 1A or 1D is opened to provide circulation through the entire corresponding circuit 12M or 12N.

To achieve this action ad assuming the mode switch 8A', is in the illustrated heating mode position, the master control zone thermostats 8A, 8D each close when the respective zone temperature $t_a$ or $t_d$ is equal to or less than the corresponding desired or set temperature $T_{as}$ or $T_{ds}$; each opens when the zone temperature $t_a$ or $t_d$ is above the set temperature $T_{as}$ or $T_{ds}$ by an amount $\Delta t_a$ representing the switching range. A range of 2° F. is illustrative.

With switches 8A or 8D closed, as when the coresponding zone temperature is less than the set temperature, the respective 2-way valve solenoid is actuated to open the valve 1A or 1D. (At the same time, an appropriate control action may occur at heating unit 9 as required.)

Thermostats 8A and 8D are seen to each control circulation through its respective branch system 12N and 12M via control over the respective valve 1A, 1D. Thus, an above-temperature condition in zone A results in the cut-off of flow through zones B and C as well. A similar relation obtains with regard to zones E and F which are controlled in this respect by zone D.

In the illustrated embodiment it is preferred that those zones be selected for master zones which have the greatest anticipated rate of temperature loss. These zones are then instrumented as shown in A and D. If zone B rather than zone A qualified as a master zone, then the valve and thermostatic systems in these two zones would be reversed from that illustrated. Preferably, the heating capacity in each of the master control zones A and D is less than that of zones B, C, E and F. To facilitate the establishment of this condition, the manually adjustable by-pass valves 2A and 2D are provided in zones A and D so that relatively less heating capacity for zones A and D may be achieved by by-passing an appropriate amount of heating medium around or past heat exchangers 5A and 5D respectively. Balanced operation of the system is aided by this condition.

An additional preferred condition in the illustrated system relates to the thermostatic elements 7B, 7C, 7E and 7F. For present purposes only the heating function contacts 25B, 25C, 25E and 25F thereof will be considered. These contacts are designed to open and close when the respective ambient temperature rises above and falls below a switching temperature $T_k$ which is equal to the set temperature $T_{bs}$, $T_{cs}$, etc., plus $\Delta t_z$ where $\Delta t_z$ is approximately equal to $\Delta t_a$, the mechanical operating differential range of the thermostats in the master control zones. Assuming this range to be 2° F. and further assuming the desired temperature $T_{bs}$ in zone B to be 70° F., then switch contacts 25B will close when the zone B temperature, $t_b$, exceeds 72° F. and will open when $t_b$ falls below 72° F. Thus the switches in the by-pass zones B, C, E, and F which are allocated to the heating function, preferably operate about a point or over a range small compared with the range of master zone thermostats. In contrast, the master zone thermostats operate over a relatively larger differential range. Furthermore, the thermostatic contacts 25B, 25C, 25E and 25F are reverse acting relative to the master zone thermostats; the former close in the case of excess temperature while the master zone contacts of thermostats 8A and 8D open.

Zones B, E and F also include flow responsive switches 14B, 14E and 14F, respectively, in their control circuits. Hence, when valve 1A in zone A is closed, circulation through level N ceases whereupon the electrical control circuit in zone B is disabled because of the opening of 14B. Closing of valve 1D produces a corresponding effect in zones E and F. Where convenient, e.g., where additional extensive wiring is not necessary, the flow responsive switch, e.g., 14B, may be used to cut off power, not only in the zone where it is installed, but in all other connected by-pass zones, e.g., zone C, as well.

Exemplary control operations in zone B involve the closure of contacts 25B when the temperature in zone B rises above the switching temperature $T_k$. If the manual switch 26B is in the "H" position, and assuring flow through lines *ab* so that switch 14B is closed, then the closure of contacts 25B will cause actuation of the solenoid valve 4B whereupon the heating medium is by-passed around exchanger 5B through shunt 20B to terminate the heating operation in zone B.

Assuming that the temperature in zone B falls below the switching value $T_k$, then contacts 25B open whereupon the solenoid is deenergized and valve 4B is returned to the position in which exchanger 5B is supplied with hot water provided zone A control system makes it available. Proper adjustment insures this availability. Heating is thereupon resumed. Similar control functions characterize zones C, E and F. In zones E and F the above action is supplemented by the operation of fan units 6E and 6F. For example, when the temperature in zone E becomes excessive, the contacts 25E close while the complementary contacts 27E open. The closing of 25E provides by-pass while the opening of 27E deactivates the respective fan unit 6E. When the temperature falls below the switching value, contacts 25E open to deenergize valve 4E; hot water in thus fed to heat exchanger 5E. At the same time contacts 27E close whereby the fan 6E is energized to circulate air through the now-heating exchanger 5E.

An exemplary overall system heating operation may be described under the initial assumption that temperature in each zone is falling. When the temperature in zone A falls below the set point, $T_{as}$, the heating mode contacts of thermostat 8A close whereupon valve 1A is opened; medium flow in level N commences. Thus, heating of zone A commences to reverse the previously assumed falling temperature condition. If it is assumed that the temperature in zone B has fallen below that value of ambient which causes switching of thermostat 7B, then the contacts 25B thereof will be open when heating of zone A commences. The by-pass valve 4B will thus be deenergized and the hot water now flowing due to the action in zone A will also flow through heat exchanger 5B in zone B and cause the temperature in zone B to rise as well. A similar action prevails with respect to zone C if the temperature therein has fallen below the switching temperature of thermostat 7C. If the temperature in either or both of zone B and C is above the respective switching temperature then the flow in that zone resulting from the control action in A, will be by-passed.

Since the relative heating capaacity of zones B and C is by manual adjustment of valve 2A and by appropriate selection of master zones as noted above, made greater than zone A, then the temperatures in these zones will rise at a rate faster than that rate prevailing at zone A. When zone B and zone C temperatures reach the respective swtching temperatures, the associated thermostatic contacts 25B and 25C will close. When this occurs, the associated by-pass valve 4B and 4C is energized thus providing the by-pass action and terminating the heating condition in the respective zone. At a latter time the temperature in master control zone A rises by the amount $\Delta t_a$, illustratively 2° F., above the set point of zone A. At this time the contacts in thermostat 8A open and valve 1A is thus deenergized and closed. Circulation thus ceases not only through zone A but through zones B and C as well; it is assumed that temperature will drop in all zones under these conditions. When the temperature in zones B and C drops below the switching value the respective by-pass valve is deenergized and the associated heat exchanger is thus placed in readiness to receive hot water as soon as the temperature in zone A drops to the point where the heating-circulating action is once again initiated. However, the switching temperature in zones B and C is set, illustratively 2° F., or slightly more, above the desired temperature $T_{bs}$, $T_{cs}$, etc., for these zones so that a drop below the switching temperature should not become excessive unless there is a much greater rate of temperature loss in these zones than in zone A. As noted hereinbefore this condition is avoided by proper selection of the master zone.

Operating characteristics under other conditions may be readily determined from the foregoing. Under some conditions the attainment of the required temperature within a particular by-pass control zone B or C may require more than one heating cycle. Ultimately however, the desired temperature setting will be obtained. This time, in any event, will be shorter than would otherwise be required; this improvement results in part from the action of valve 2A in overbalancing the heating capacities of zones B and C relative to the heating capacity of zone A.

The characteristics described with respect to zones A, B and C in level N also apply to zones D, E and F in level M.

It should be understood that in some applications, all of the radiators in a particular zone need not be controlled as described above and in a well balanced installation within a large building only a fraction of the radiators in large open areas may need the by-pass arrangement. It should also be understood that the illustrated control elements including valves and switches may be reversed or otherwise modified as is well known in the art, provided additional complementary reversals are made so that the net control effect remains unchanged.

COOLING

The application of the system to cooling functions follows generally the organization and procedures heretofore described. To illustrate the cooling mode, FIG. 1 includes schematic representations of a coolant source and control system 9C which with the aid of valve 30 in line 12 and valve 31 in line 13, may be substituted in the system for the heating unit 9. The cooling unit 9C includes the required pump, control arrangements and the like (not shown). To simplify the illustration only level N is shown equipped for cooling, it being assumed that circulation through level M as well as the control circuits thereof, are cut-off during these operations. Switch 8D may include a section for disabling operations in zone D while 26E and 26F perform like functions in zones E and F.

In the cooling mode, the mode selector 8A' in zone A is switched to the "C" position whereupon those contacts of thermostat 8A are activated which are complementary to the heating contacts. A temperature above the set value $T_{as}$ by some increment $\Delta t_a$, e.g. 2° F., causes these contacts to close; they open when zone A temperature falls below $T_{as}$.

The mode selectors 26B and 26C in zones B and C respectively, are also set to their "C" positions whereby thermostatic contacts 28B and 28C assume control. Each of these contacts opens when the switch temperature exceeds the set value and closes when the switch temperature falls below the set value. Preferably, and in analogy to the heating mode, the switching value is set equal to the desired value plus an increment which equals or exceeds the range of thermostatic element 8A in zone A.

Assuming an ambient temperature initially less than the set temperatures, say 70° F. in A, B and C, then valve 1A is deenergized and therefore closed; there is no coolant circulation and by-pass valves 4B and 4C are in the by-pass position. Zones B and C remain by-passed until the respective ambient temperature exceeds the set value, $T_{bs}$, $T_{cs}$ which is illustratively 70°. When this occurs, the related contacts 28B, 28C open and the associated by-pass valve 4B, 4C is transferred out of the by-pass position to allow cooling to commence. As ambient temperature in zone A increases to a point exceeding the upper switching temperature, e.g., 72°, the controlling contacts of thermostat 8A close thereby opening valve 1A and initiating a cooling action in unit 9C. Circulation and cooling of zone A thus commences. Cooling in zones B and C thus commences as well. With respect to zone A, the cooling of zone B and C is preferably rapid; as the temperatures of these zones drop below the set value, the by-pass condition is reestablished through the closure of contacts 28B, 28C.

When zone A has cooled below the set temperature $T_{as}$ when the active contacts thereof open; valve 1A is de-energized and circulation and cooling cease in zones A, B and C.

The switching value of thermostats 7B and 7C is in the cooling mode substantially equal to the respective set value. As noted hereinbefore, it is preferred that the thermostatic control elements 7B, 7C, 7E and 7F be more sensitive than those in the associated master control zones A and D. For achieving the requisite sensitivity in heating and/or cooling operations, suitable thermostatic elements may be employed. An illustrative control arrangement is shown in FIG. 2.

Figure 2:
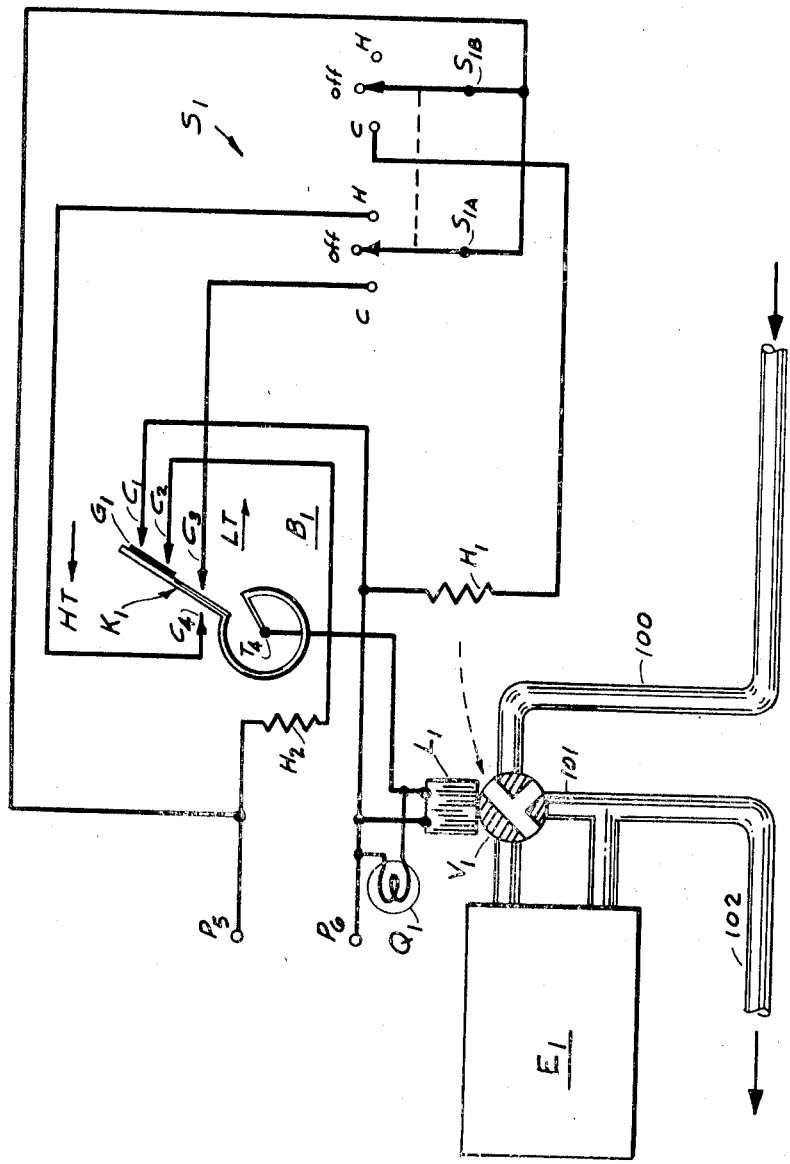
FIGS. 2 and 2A are schematic fragmentary diagrams illustrating alternate thermostatic control arrangements.

As seen in FIG. 2 a snap acting thermostatic element $B_1$ includes a switching arm $K_1$ adapted in one position to close a pair of fixed contacts $C_1$, $C_2$ by way of a bridge $C_1$ on an insulated portion of the arm. In this same position of $K_1$, which represents the low temperature condition, a contact $C_3$ is connected to the element arm and thus to a terminal $T_4$. This circuit is insulated from the circuit involving contacts $C_1$ and $C_2$. In its other or high temperature position, switch arm $K_1$ provides a connection between a contact $C_4$ and the terminal $T_4$.

In thermal relationship with element $B_1$ is a pair of heaters $H_1$ and $H_2$, these heaters being energized under certain conditions from power source terminals $P_5$, $P_6$ as described more fully hereinafter.

In circuit connection with the thermostatic switch is a mode selector switch $S_1$ including ganged sections $S_{1a}$ and $S_{1b}$. The switch has three positions, "C," "OFF," and "H," applicable to the cooling, shut down and heating modes, respectively.

The operation of the thermostatic control will be described in relation to its control over the by-pass valve $V_1$ having a solenoid $L_1$. The valve is connected to the input of exchanger $E_1$ and to shunt pipe 101 to provide the by-pass control functions hereinbefore described. Cooling and heating media are selectively applied to the inlet of $V_1$ via pipe 100 while the outlet from the exchanger is by way of a pipe 102. The valve may be adapted for manual adjustment in addition to solenoid control. With the aid of a suitable indicator such as lamp $Q_1$ connected across the solenoid to indicate system cycling, the valve may be initially manually adjusted to establish system balance.

The circuit connections in the above-described arrangement are as follows.

Heater $H_2$ is connected between power terminal $P_5$ and thermostatic contact $C_2$. Heater $H_1$ is connected between power terminal $P_6$ and the "C" contact of switch section $S_{1b}$. Terminal $P_6$ is also connected to thermostatic contact $C_1$. Solenoid $L_1$ is connected between power terminal $P_6$ and terminal $T_4$ of the element $B_1$. The arms of switch sections $S_{1a}$ and $S_{1b}$ are connected together and to power terminal $P_5$. The "C" contact of $S_{1a}$ is connected to thermostatic contact $C_3$ on $B_1$ while contact $C_4$ thereof is connected to contact "H" and $S_{1a}$.

Heating operation involves the setting of mode selector $S_1$ to the "H" position. It is initially assumed that the ambient temperature is below the set valve $T_s$, illustratively 70°, in which case thermostatic switch arm $K_1$ is in the position shown. Under these conditions heater $H_2$ is energized by way of the circuit which is connected from terminal $P_5$ through $H_2$, through $C_2$ and $C_1$ to terminal $P_6$. Each heater is preferably designed to elevate the thermostatic temperature $t_k$ above ambient temperature $t_a$ by an amount $\Delta t_a$ which is approximately equal to the operating range or sensitivity of the thermostatic element $B_1$. For illustration, this increment will be assumed to be 2° F.

Hence, each heater raises the thermostat temperature by 2° above ambient, for a total of 4°. The thermostatic element is designed such that a thermostat temperature $T_{k1}$ which is 4° above the set point, illustratively 74°, causes the arm $K_1$ to switch to the high temperature position (to the left in FIG. 2) while a thermostat temperature $T_{k2}$ which is 2° above the set point, illustratively 72°, causes the arm $K_1$ to switch to the low temperature or illustrated position.

With the ambient temperature at or below the 70° set point then the thermostat temperature will be at or below 72° and the switch will be in the position shown with heater $H_2$ energized. When the ambient temperature rises to 2° above the set point, i.e., to 72° then the thermostat temperature will exceed the set point by 4°, i.e., will be greater then 74°. This is the upper switching temperature. Hence, arm $K_1$ will switch to the high temperature position. When this occurs contacts $C_1$ and $C_2$ are disconnected and the circuit to heater $H_2$ is opened; while the contact $C_4$ is engaged and circuit to the solenoid $L_1$ of valve $V_1$ is closed. This closed circuit may be traced from terminal $P_6$, through the solenoid to terminal $T_4$ and thence through the thermal element to contact $C_4$; from $C_4$ the circuit connection is to contact "H" of $S_{1a}$ and thence to power terminal $P_5$. Hence, when the ambient temperature is 72° (and thermostat temperature 74°), valve $V_1$ is energized to cause bypass action. With the heater $H_2$ deenergized, the thermostat temperature drops and approaches ambient temperature.

When the room temperature falls below 72° F. switch arm $K_1$ will switch back to the illustrated low temperature position since the thermostat temperature is now the same as ambient, and, as previously noted, switching to the low temperature position occurs at a thermostat temperature below 72°. When this occurs valve $V_1$ is deenergized to terminate the by-pass action. At the same time, energization of heater $H_2$ is renewed.

It may be seen from the foregoing that the switching action essentially occurs about a point, e.g., 72° F. ambient.

For the cooling mode, switch $S_1$ is set to the "C" position. At this time heater $H_1$ is connected between the power terminals as may be seen by tracing the path from terminal $P_6$ through $H_1$, through the "C" contact and arm of $S_{1b}$, and thence to power terminal $P_5$. Hence, this heater is continuously energized in the cooling mode independent of the switching actions of element $B_1$.

When the ambient temperature is greater than the desired temperature, e.g., 70°, then the thermostat temperature is higher than 72°. Assuming these conditions for a sufficient length of time, the arm $K_1$ is in the high temperature position. When the ambient temperature drops below the set value 70° the thermostat temperature drops below 72° and arm $K_1$ switches to the low temperature position. When this occurs solenoid $L_1$ is actuated from terminal $P_6$ through the solenoid, through terminal $T_4$ and contact $C_3$ to the "C" contact $S_{1a}$. From that point connection is made via the arm of $S_{1a}$ to power terminal $P_5$. The by-pass operation is thus initiated. At the same time, heater $H_2$ is energized from terminal $P_5$, through the heater and via contacts $C_1$ and $C_2$ to terminal $P_6$. In view of this action the thermostat temperature will rise 4° above ambient temperature. Hence, when the ambient temperature rises above the set value of 70°, the thermostat temperature will exceed 74° and the thermostat switch arm $K_1$ will be transferred to the high temperature position. Valve $V_1$ is thereby deenergized, the by-pass operation terminated and cooling initiated. At the same time heater $H_2$ is deenergized.

It may be seen that in the cooling mode switching occurs about the set temperature point of 70° ambient. On the other hand, switching during heating occurs about the upper limit which is 72° ambient in the example.

Figure 2A:
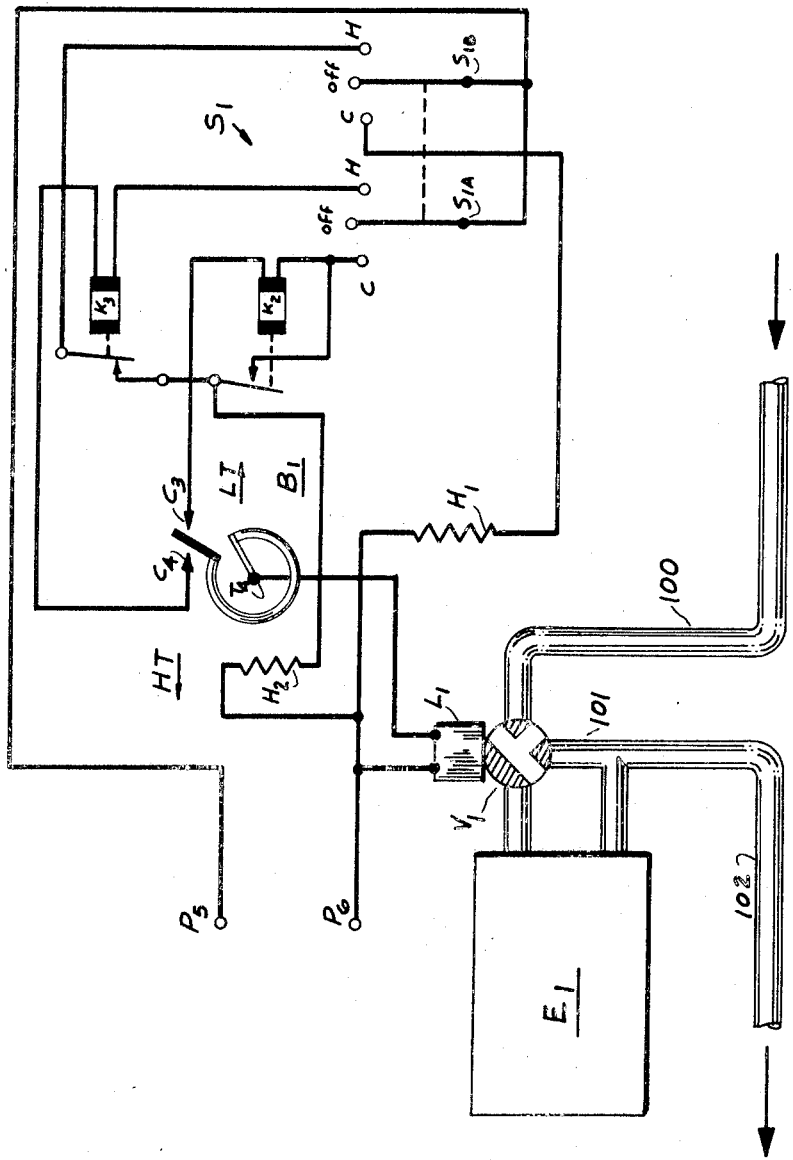

Another embodiment of a thermostatic control element suitable for use according to the invention is illustrated in FIG. 2A. The control system therein illustrated differs from the arrangement of FIG. 2 in the following respects. The circuit of heater $H_2$, instead of being completed through the contacts $C_1$ and $C_2$ of FIG. 2, is controlled by a pair of relays $K_2$ and $K_3$.

Relay $K_2$ has its field connected between the C contact of $S_{1a}$ and contact $C_3$ of thermostatic element $B_1$. Relay $K_3$ is connected between the H contact of $S_{1a}$ and contact $C_4$ of $B_1$. One of the normally-open contacts of $K_2$ is connected to contact C of $S_{1a}$. The other contact is connected along with one of the normally closed contacts of $K_3$, to one side of heater $H_2$. The other side of this heater is connected to power terminal $P_6$. The other normally-closed contact of relay $K_3$ is connected to contact H of $S_{1b}$. The switch is shown in its low temperature position.

With the mode selector in the H (heating) position, and in the illustrated low temperature condition, heater $H_2$ is energized via the normally-closed contacts of $K_3$ and contact H of $S_{1b}$ so that it is connected between terminals $P_5$ and $P_6$. $K_3$ is deenergized since $C_4$ is open. Heater $H_1$ is deenergized because C of $S_{1b}$ is not in the cuit. When element $B_1$ transfers to the high temperature position relay $K_3$ is connected in series with solenoid $L_1$ across the power terminals $P_5$ and $P_6$. The actuation of $K_3$ causes the normally-closed contacts thereof to open whereby the circuit of heater $H_2$ is opened In the cooling mode the switch $S_1$ is set to the C position. Heater $H_1$ is thereby energized. With the thermostatic element $B_1$ in the low temperature condition, relay $K_2$ is energized via the C contact of $S_{1a}$, the $C_3$ contact of $B_1$, and the solenoid $L_1$. With the $K_2$ thus energized, heater $H_2$ is connected across the power source terminals via the now-closed contacts of $K_2$ and contact C of $S_{1a}$. When $B_1$ is transferred to the high temperature condition, $K_2$ is deenergized thus deenergizing $H_2$.

It may be seen that the overall operation of the arrangement of FIG. 2A is similar to that of FIG. 2.

Figure 3:
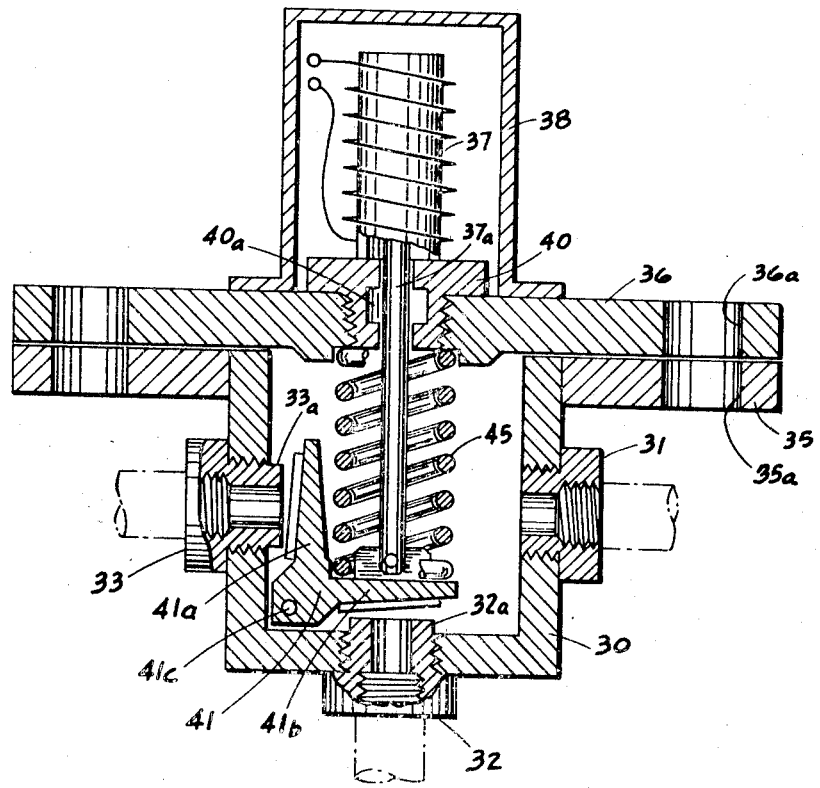
FIG. 3 is an elevational sectional view partly schematic of a valve arrangement which may be employed in the system of FIG. 1.

A solenoid actuated valve suitable for use according to the invention is illustrated in FIG. 3 and comprises a valve body 30 having an inlet connector 31 threaded into the valve interior in one side thereof, a by-pass connector 32 threaded into the interior in another side thereof, and an outlet connector 33 similarly threaded in a third side. Connectors 32 and 33 include integral valve seat sections 32a and 33a, respectively.

Valve casing 30 includes a flange section 35 adapted to mate with a flat member 36 forming a support for solenoid means 37 and the case 38 therefor. Member 36 includes assembly holes 36a in alignment with holes 35a in the flange, and is conveniently tapped centrally to threadably receive an annular base 40 on which solenoid 37 is mounted. Through the center of 40 and a packing or seal 40a therein, solenoid core or armature 37a extends, passing into the interior of valve body 30.

The distal end of core piece 37a is pivotally coupled with clearance to a compound valve head 41 having one valve section 41a adapted to control outlet 33, and another generally orthogonal section 41b for closing bypass 32a. Valve 41 is pivoted to the valve body as by a pin 41c.

The valve is shown approaching the energized position where outlet 33 is closed and 32 opened. When the solenoid is deenergized a spring 45, which coaxially surrounds magnet core 37a or an extension thereof and is compressed between valve 41 and a recess in member 36, urges the valve in the clockwise direction as shown in the figure, causing 32 to close and 33 to open.

For simple two-way action for use as 1A or 1D in FIG. 1, the outlet 33 may be plugged. For reverse two-way valve operation (valve closed when energized), outlet 32 may be plugged.

It should be understood that the system and components herein described are exemplary only. Modifications will undoubtedly occur to those skilled in the art. For example, the invention may be practised with temperature control systems wherein two or more heat transfer media are mixed to adjust thermal conditions or wherein basic control involves the imparting of heat to or withdrawal from, the heat transfer medium.

In the study and practise of the invention, modifications will undoubtedly occur to those skilled in the art. The invention is accordingly not limited to the specific mechanisms shown and described, but departures may be made therefrom within the scope of the accompanying claims, without sacrificing the chief advantages.

What is claimed is:

1. Temperature responsive apparatus for controlling liquid flow in accordance with variations from a preselected ambient temperature comprising
    (a) a snap acting thermostatic element having a high temperature position and a low temperature position, said element being inherently mechanically operable at different temperatures for switching from said high position to said low position and vice versa,
    (b) heater means thermally coupled to said thermostatc element for raising the temperature of said element above ambient when energized,
    (c) solenoid valve means having two controlled outlet ports for affecting said liquid flow,
    (d) fixed contacts positioned to be opened and closed by said thermostatic element during switching, and
    (e) electrical circuit means comprising
        (1) a heating circuit means for controlling the flow of said heating medium;
        (2) a cooling circuit means for controlling the flow of said cooling medium; and
        (3) mode selector means having a heating mode position for establishing said heating circuit means and cooling mode position for establishing said cooling means;
    wherein said electrical circuit means interconnects said thermostatic element, heater means, solenoid valve means and fixed contacts such that said heater means is energized whenever said element is in a preselected one of its said two positions, and said solenoid valve means is actuated whenever said element is in a preselected one of its said positions.

2. Apparatus in accordance with claim 1 in which said heater means is electrically coupled to said thermostatic element so as to impart to said thermostatic element a temperature increase substantially equivalent to the range defined by said two mechanical switching temperatures of said element.

3. Apparatus in accordance with claim 1, said heater means and said solenoid valve means being electrically coupled to said thermostatic element so as to be actuated at different thermostatic settings.

4. Apparatus in accordance with claim 3, said heater means being electrically coupled to said thermostatic element so as to be actuated when said thermostatic element is in said low temperature position.

5. Apparatus in accordance with claim 1, said heater means and said solenoid valve means both being electrically coupled to said thermostatic element so as to be actuated at the same thermostatic setting.

6. Apparatus in accordance with claim 5, said heater means and said solenoid valve means both being electrically coupled to said thermostatic element so as to be actuated when said thermostatic element is in said low temperature position.

7. Apparatus in accordance with claim 1 adapted for flow control of either a heating medium or a cooling medium, said electrical circuit means comprising heating circuit means for controlling the flow of said heating medium and cooling circuit means for controlling the flow of said cooling medium and mode selector means having a heating mode position for establishing said heating circuit means and a cooling mode position for establishing said cooling circuit means.

8. Apparatus in accordance with claim 1, said heater means being electrically coupled to both said heating circuit means and said cooling circuit means so as to be actuated in either of said circuits by the same thermostatic element setting and said solenoid valve means being electrically coupled to both said heating circuit means and said cooling circuit means so as to be actuated in either of said circuits by thermostatic element settings that vary depending upon which of said circuit means is selected.

9. Apparatus in accordance with claim 8, said heater means and said solenoid valve means being electrically coupled to said cooling circuit means so that both said heater means and said solenoid valve means are actuated when said thermostatic element registers said low temperature position.

10. Apparatus in accordance with claim 1 for controlling flow of said heating medium in accordance with variations from a first ambient temperature and for controlling flow of said cooling medium in accordance with variations from a second ambient temperature, comprising additional heater means connected to be energized in both temperature positions of said thermostatic element but only when said mode selector means is in said cooling mode position, said other heater means being connected to be energized in both mode positions of said selector means whenever said thermostatic element is in its said low temperature position.

11. Apparatus as defined in claim 1 in which said fixed contacts include separate contacts for said solenoid valve means and said heater means and in which the switching arm of said thermostatic element includes two switching sections to establish coordinate but independent control of the operation of said valve means and said heater means.

12. Apparatus in accordance with claim 1 in which said mode selector means includes relay means interconnected with said fixed contacts for establishing coordinate but independent control of the operation of said solenoid valve means and said heater means.

13. Apparatus in accordance with claim 10 in which said dual mode heater means and said single mode heater means are electrically coupled to said thermostatic element so as to impart to said thermostatic element a temperature increase substantially equivalent to the range defined by said two mechanical switching temperatures of said element, the differential between said two ambient control temperatures being the same as said mechanical thermostatic switching range.

14. Apparatus as defined in claim 10, said solenoid valve means being electrically coupled to said heating circuit means so as to be energized when said thermostatic element is in its said high temperature position, and is electrically coupled to said cooling circuit means so as to be energized when said thermostatic element is in its said low temperature position.

15. A high sensitivity temperature responsive switch having a heating control mode and a cooling control mode comprising
 (a) a snap acting thermostatic element having a high temperature position and a low temperature position, said element being inherently mechanically operable at different temperatures for switching from said high position to said low position and vice versa,
 (b) a heater thermally coupled to said thermostatic element for raising the temperature of said element above ambient when energized,
 (c) fixed contacts adapted to be opened and closed by said thermostatic element during switching, and
 (d) electrical circuit means including mode selector means for selecting in accordance with the desired mode the temperature position of said thermostatic element about which response is to occur, said circuit means interconnecting said thermostatic element, heater and fixed contacts such that said heater is energized whenever said element is in its said low temperature position regardless of the mode setting of said selector means.

16. A switch in accordance with claim 15, said heater being electrically coupled to said thermostatic element so as to impart to said thermostatic element a temperature increase substantially equivalent to the range defined by said two mechanical switching temperatures of said element.

17. A switch in accordance with claim 15 in which said fixed contacts include output contacts and in which the switching arm of said thermostatic element includes two switching sections to permit coordinate but independent control of said output contacts and said heater.

18. A switch in accordance with claim 15 in which said fixed contacts include output contacts and in which said mode selector means includes relay means interconnected with said heater and said fixed contacts to permit coordinate but independent control of said output contacts and said heater.

19. A switch in accordance with claim 15 for operation about different ambient temperatures in said two modes, comprising a second heater thermally coupled to said thermostatic element for raising the temperature of said element when energized, said second heater being connected for energization independently of the operation of said thermostatic element and for control solely by said mode selector means.

20. A switch in accordance with claim 19, said second heater being connected for energization whenever said mode selector means is set for cooling control.

21. A switch in accordance with claim 20, said second heater being electrically coupled to said thermostatic element so as to impart to said thermostatic element a temperature increase substantially equivalent to the difference between said two ambient temperatures.

References Cited

UNITED STATES PATENTS

| 2,161,248 | 6/1939 | Denison et al. | 236—84 |
| 2,240,731 | 5/1941 | Van Vulpen | 165—22 X |
| 2,462,217 | 2/1949 | Oaks | 239—99 |
| 2,751,152 | 6/1956 | Ellenberger. | |
| 2,842,345 | 7/1958 | Brown. | |
| 3,001,479 | 9/1961 | Swenson et al. | 165—22 |
| 3,111,010 | 11/1963 | Spofford | 62—176 |
| 3,113,439 | 12/1963 | Eargle. | |
| 3,202,208 | 8/1965 | Geringer | 165—50 X |
| 3,227,372 | 1/1966 | Prokupek et al. | 165—50 |
| 3,351,128 | 11/1967 | Barnd | 165—22 |
| 2,121,625 | 6/1938 | Crago. | |
| 2,152,699 | 4/1939 | Kuester. | |
| 2,164,352 | 7/1939 | Sargent. | |
| 2,180,802 | 11/1939 | Dillman. | |
| 2,308,555 | 1/1943 | Tate. | |

EDWARD J. MICHAEL, Primary Examiner

U.S. Cl. X.R.

237—8, 56